(12) United States Patent
Gwin

(10) Patent No.: US 7,921,715 B2
(45) Date of Patent: Apr. 12, 2011

(54) HANDHELD WINDSOCK WITH DIAL INDICATOR

(76) Inventor: Randall Gwin, Newport Beach, CA (US)

( * ) Notice: Subject to any disclaimer, the term of this patent is extended or adjusted under 35 U.S.C. 154(b) by 81 days.

(21) Appl. No.: 12/541,849

(22) Filed: Aug. 14, 2009

(65) Prior Publication Data

US 2010/0037687 A1  Feb. 18, 2010

Related U.S. Application Data

(60) Provisional application No. 61/089,758, filed on Aug. 18, 2008.

(51) Int. Cl.
    *G01P 13/00* (2006.01)
(52) U.S. Cl. .................................................. 73/170.07
(58) Field of Classification Search .................. None
    See application file for complete search history.

(56) References Cited

U.S. PATENT DOCUMENTS

| 2,467,374 | A | * | 4/1949 | Findlater | 73/170.07 |
|---|---|---|---|---|---|
| 3,744,714 | A | * | 7/1973 | Banner | 235/88 G |
| 4,864,854 | A | * | 9/1989 | vanLeemput | 73/170.07 |
| 5,319,967 | A | * | 6/1994 | Rickards, Jr. | 73/170.06 |
| 6,578,429 | B1 | * | 6/2003 | Danna et al. | 73/732 |
| 6,684,174 | B2 | * | 1/2004 | Clark et al. | 702/138 |
| 2005/0034517 | A1 | * | 2/2005 | Williamson | 73/170.04 |
| 2009/0013571 | A1 | * | 1/2009 | Edmonds | 40/564 |
| 2010/0186496 | A1 | * | 7/2010 | Galley et al. | 73/170.06 |
| 2010/0212199 | A1 | * | 8/2010 | Edmonds | 40/581 |

* cited by examiner

*Primary Examiner* — Andre J Allen
(74) *Attorney, Agent, or Firm* — Sean D. Burdick

(57) ABSTRACT

A handheld windsock includes a housing with a graduated dial indicator mounted on the housing. A cord attached to the housing overlays the graduated dial indicator and a miniaturized chute is attached to an end of the cord. In response to airflow, the miniaturized chute displaces the cord in relation to the graduated dial indicator, providing a readable indication of the wind speed. Wind direction may be obtained as the direction of maximum displacement of the miniaturized chute. A data table displayed on the housing allows a user, such as a golfer, to cross-reference a measured wind speed to a quantitative adjustment, such as a numerical adjustment to the selection of a golf club.

20 Claims, 4 Drawing Sheets

HANDHELD WINDSOCK WITH DIAL INDICATOR

RELATED APPLICATIONS

This application claims priority to U.S. Provisional Application No. 61/089,758 filed Aug. 18, 2008, which is fully incorporated herein by reference.

BACKGROUND OF THE INVENTION

1. Field of the Invention

The present invention relates generally to handheld devices for measuring wind speed and wind direction and, more particularly, to a handheld windsock with a dial indicator and a data conversion table for use during golf play.

2. Description of Related Art

Golf is a game of precision and consistency. A golfer's effectiveness can be measured by his or her ability to repeatedly drive a golf ball with precision over a total range of 250 yards to 700 yards and place the ball in a hole 4.25 inches in diameter. To increase precision during play, golfers notoriously seek every possible advantage, for example, by using equipment designed to help provide consistent results through repeated golf swings.

The extreme precision required in golf has led to numerous technical innovations in golfing equipment designed to improve consistency in performance. Golf club shafts made of carbon fiber are intended to produce a consistent golf stroke. Golf gloves are manufactured to provide a consistent, cushioned grip. Spiked golf shoes are available to ensure consistent footing. Even electronic rangefinders are currently available, allowing a golfer to measure the distance to the hole and select the appropriate swing and club.

One significant factor affecting a golfer's ability to drive a ball accurately and consistently is the variation of wind speed and direction. It is known to measure wind speed and wind direction on a golf course by plucking blades of grass from the turf, throwing them up into the air, and watching the distance and direction the blades travel. This manner of measuring wind speed, however, leaves a lot to the imagination, and provides inconsistent measurements because the surface area of the blades varies and because the type of grass used will produce inconsistent travel.

In addition, it is also known to study the motion of nearby flags or banners on and near the golf course to determine wind speed and wind direction. This manner of measuring wind speed and wind direction also produces inconsistent results because the varied surface area, weight, and material used in the banner will result in inconsistent movements. Also, the flag used to gauge the wind may be displaced some distance from the golfer, and not accurately represent wind speed and direction in the immediate vicinity of the golfer.

One solution for predicting the effects of wind on the flight of a golf ball comes in the form of a portable electronic anemometer. This manner of measuring wind speed possesses all the limitations of electronic devices. The electronic anemometer may lose electrical power on the golf course, may experience an electronic malfunction, or may drift out of calibration. In any event, the anemometer is an expensive solution, and its effectiveness is limited because it only measures wind speed and not wind direction.

SUMMARY OF THE INVENTION

The present invention is intended to avoid the limitations of prior wind speed and wind direction measurement devices, and to provide a durable, consistent, and portable wind speed and wind direction measurement device designed to meet the needs of a golfer. In addition, the present invention is designed to provide information to the golfer specifically for selecting the proper swing, distance, and golf club according to the measured wind speed and direction.

The invention discloses a handheld windsock with dial indicator. The handheld windsock with dial indicator includes a housing with a graduated dial indicator mounted on or within the housing, a cord attached to the housing, and a miniaturized chute attached to the opposite end of the cord. The cord overlays the graduated dial indicator. The cord is suspended from the dial indicator, and in the absence of airflow, hangs motionless and vertical as a plumb line. In response to airflow, the miniaturized chute displaces from the vertical, which causes the cord to move in relation to the graduated dial indicator, creating a readable indication of the wind speed. Wind direction may be indicated as the direction of maximum displacement of the miniaturized chute. The housing may include a transparent cover on the housing through which the graduated dial indicator is visible.

A data table may be displayed on one side of the housing. The data table may include information relating to the wind speed measured on the graduated dial indicator. The data table may provide information relating to a quantitative adjustment to be made by the user of the handheld windsock with dial indicator in relation to the measured wind speed. In one embodiment, the quantitative adjustment may be a numerical adjustment for selecting a golf club.

The cord may be extendible outward from the housing, increasing the length of the cord and the displacement of the miniaturized chute from the housing. The cord may be retracted to the housing to decrease the length of the cord and the displacement of the miniaturized chute from the housing. When the cord is extended or retracted, the remainder of un-extended, or retracted cord may be stored on a rotatable spool located within the housing. The cord may be retracted to the spool through a spring-operated mechanism located within the housing. When the cord is fully retracted, the miniaturized chute may be secured to the housing through an attachment point formed on the housing. In one embodiment, the miniaturized chute may be shaped as a concave substantially semi-dome shape with a plurality of perforations for air to flow through the miniaturized chute.

Related embodiments may include means for leveling the handheld windsock with dial indicator, such a bubble level mounted to the housing, or a straight line extending across the housing for visually orienting the housing with the horizon. Other embodiments include the dial indicator graduated by spaced striations, or a color coded pattern.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals designate like parts throughout the different views, wherein:

DETAILED DESCRIPTION OF THE INVENTION

Figure 1:
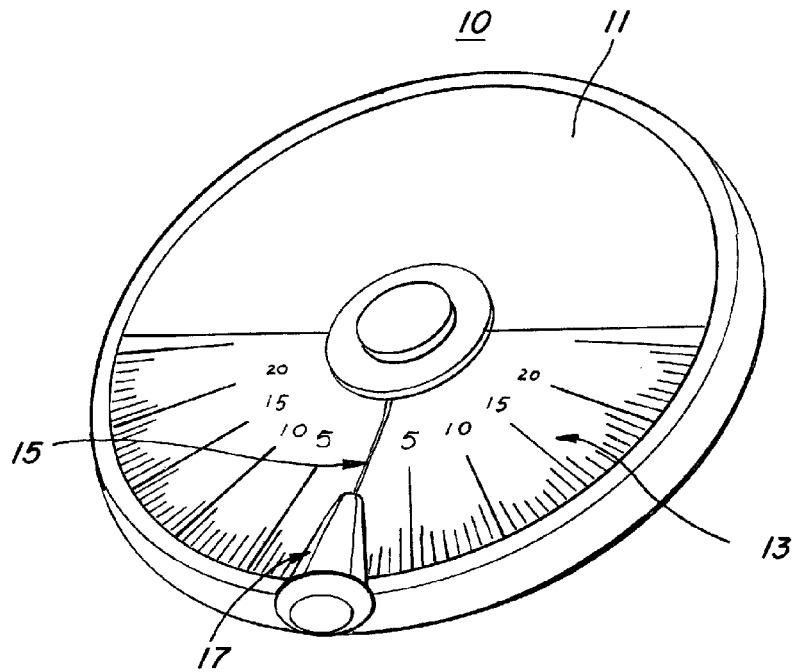
FIG. 1 is a perspective view of an embodiment of the handheld windsock with dial indicator.

The following disclosure presents an exemplary embodiment of the invention for a handheld windsock with dial indicator 10. FIG. 1 is a perspective view of an embodiment of the handheld windsock with dial indicator. Referring to FIG. 1, the handheld windsock with dial indicator 10 ("windsock") is composed of a housing 11, a graduated dial indicator 13 mounted to or within the housing 11, a cord 15 attached to the housing 11, and a miniaturized chute 17 attached to a lower end of the cord 15.

Figure 2:
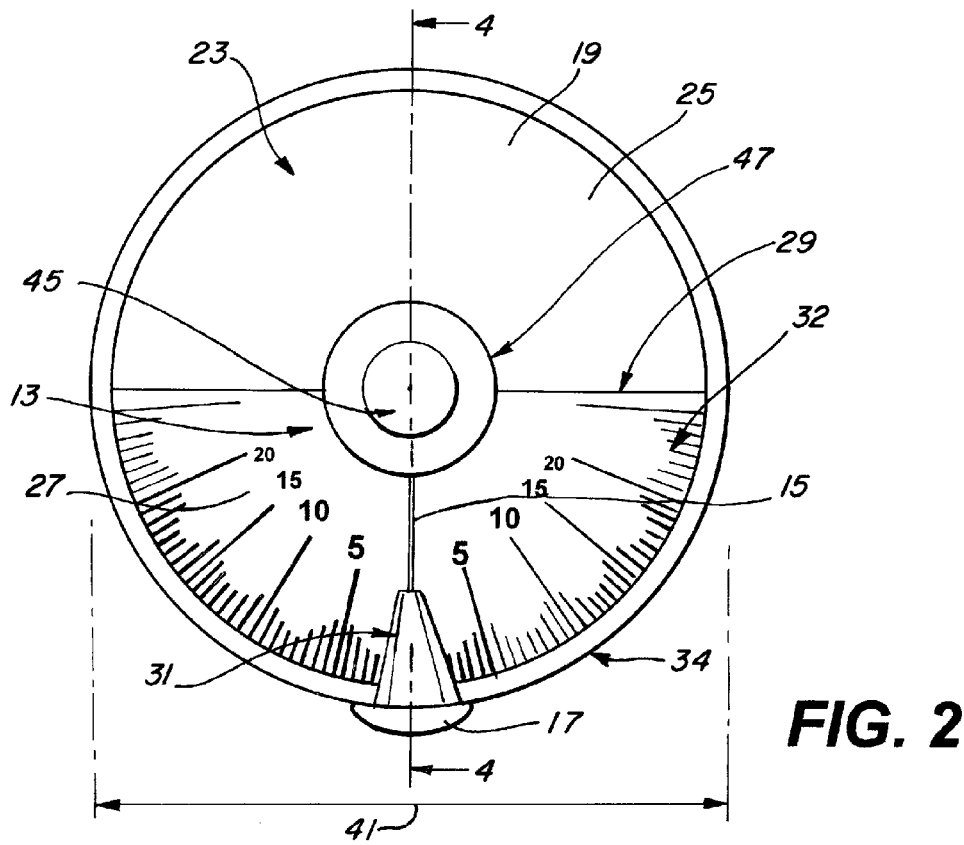
FIG. 2 is a front view of an embodiment of the handheld windsock with dial indicator.
Figure 3:
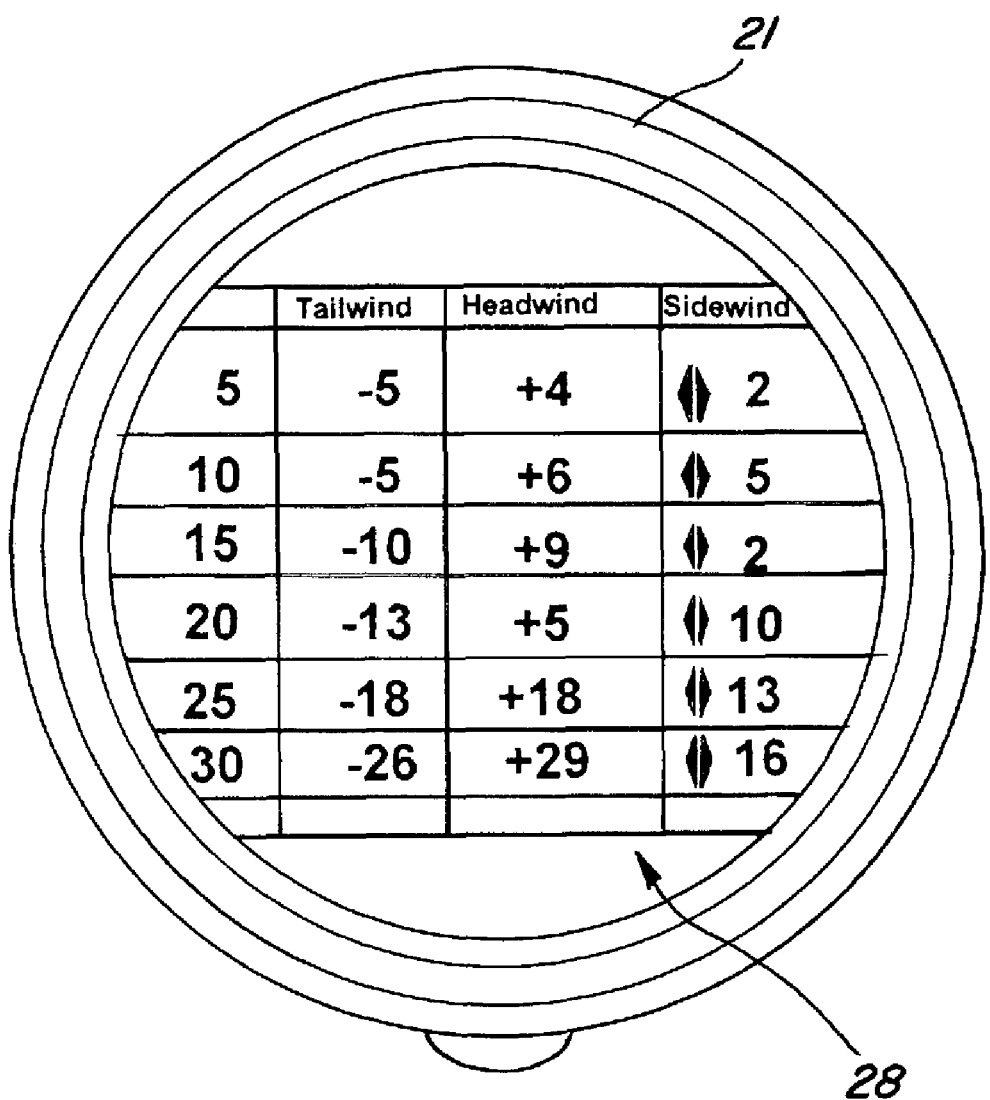
FIG. 3 is a rear view of an embodiment of the handheld windsock with dial indicator.

FIG. 2 is a front view of an embodiment of the windsock. FIG. 3 is a rear view of an embodiment of windsock. Referring to FIGS. 2 and 3, the housing 11 may be composed of two housing sections combined together, a front housing 19 and a back housing 21. The housings 19 and 21 may be generally circularly shaped. The face 23 of the front housing 19 may be divided into two regions, a top half 25 and a bottom half 27. The top half 25 may be opaque and the bottom half 27 may be composed of a transparent cover. The bottom half 27, transparent cover region of the front housing 19 may reveal the graduated dial indicator 13 located between the front housing 19 and back housing 21. The cord 15 may be attached to the housing 11 at a central location between the front housing 19 and back housing 21, and may be routed between the bottom half 27 transparent cover region of the front housing 19 and the graduated dial indicator 13. The cord 15 may be suspended from the central location by its upper end, so that it hangs as a plumb line toward the bottom of the front housing 19. The lower end of the cord 15 may be attached to the miniaturized chute 17. The cord 15 may be extended away from the housing 11, increasing the length of the cord 15 that lies below the housing 11. The cord 15 may be mechanically retracted to the housing 11. A data table 28 may be placed on the back housing 21.

In operation in still air, the miniaturized chute 17 hangs steadily downward by the force of gravity. In this case, as indicated in FIGS. 1-2, the position of the cord 15 relative to the graduated dial indicator 13 coincides with the zero location, which is an indication of no wind speed. In response to airflow, the miniaturized chute 17 may become displaced from the zero location along the left or right side of the dial indicator. The displacement of the miniaturized chute 17 causes the cord 15 to move in relation to the graduated dial indicator 13, creating a readable indication of the wind speed.

Referring again to FIG. 1, the face 23 of the front housing 19 may be divided into two halves, the top half 25 made from opaque plastic or other suitable material, and the bottom half 27, made from a transparent material, such as glass or clear plastic. The top half 25 may comprise a flat surface to allow for labeling or design. In an alternative embodiment, the surface of the top half 25 may be textured in the style of a golf ball with dimples, or frosted. In another embodiment, the dividing line between the top and bottom half may include a straight line 29 extending across the housing 11. The straight line 29 may be used as a reference line to align the housing 11 with the horizon. The straight line 29 may be composed of ink or plastic, for example, a red plastic strip. The bottom half 27 transparent cover may reveal the graduated dial indicator 13 located within the front housing 19. The dial indicator 13 may contain a graduated scale 32 which allows the user to determine the wind speed by observing the position of the cord 15 relative to the dial indicator 13. The graduated scale 32 may comprise striations placed at intervals. The striations may be associated with printed numerical values. In an alternative embodiment, a bottom rim 34 of the front housing 19 may include spaced striations (not shown).

Figure 4:
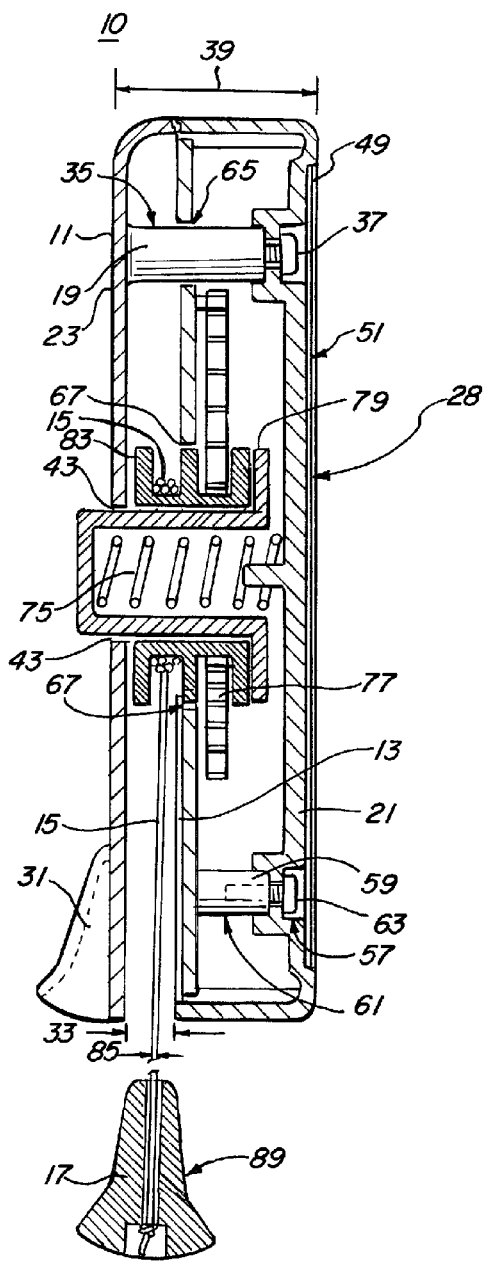
FIG. 4 is a side cross section of an embodiment of the handheld windsock with dial indicator.

Referring to FIGS. 1 and 4, an attachment point may be formed on the front housing 11 for securing the miniaturized chute 17. The attachment point may comprise a contour shaped cavity 31 in the transparent cover of the bottom half 27. The cavity 31 may be contour shaped at the bottom of the front housing 19 to conform to the shape of the miniaturized chute 17. The shaping of the cavity 31 secures the miniaturized chute 17 in place when the cord 15 is fully retracted. In an alternative embodiment, the transparent cover of the bottom half 27 may be shaped in any manner to secure the miniaturized chute 17 in place.

In one embodiment, the front housing 19 and back housing 21 may form a total diameter 41 of the windsock 10 of approximately 1.50 to 2.0 inches. Dimensions are illustrative and may be increased or decreased.

Referring again to FIG. 2, the front housing 19 may contain a depressible button 45 which protrudes forward from the face 23 of the front housing 19. The depressible button 45 may be surrounded by a ring 47 that is attached to the front housing and provides a bearing surface for the button. In an alternative embodiment, the button 45 may be surrounded by a washer (not shown). The ring 47 or washer may be composed of aluminum or other suitable material. In another embodiment, the depressible button 45 may be located in the top half 25 of the front housing 19.

In another embodiment, the front housing face 23 may include a bubble level (not shown) attached near the middle of the front housing 19 to allow a user to level housing 11 with respect to the horizon. In an alternative embodiment, the bubble level may be mounted in any location on the housing 11 to provide a reading of the housing's 11 position relative to the horizon.

FIG. 4 is a side cross section of an embodiment of the handheld windsock 10. This view shows the front housing 19 contacting the back housing 21 along the top half of the two housings 19, 21. The front housing 19 does not contact the back housing 21 along the bottom half of the housings 19, 21. A gap 33 is present between the front housing 19 and the back housing 21. The gap 33 allows the cord 15 to move freely between, and parallel to, the front housing 19 and the dial indicator 13. The gap 33 may extend along the entire lower periphery of the front housing 19, for example, along a 180 degree span. The gap 33 has a width sufficient to allow the cord to move freely between the front housing 19 and the dial indicator 13.

The front housing 19 may be attached to the back housing 21 by one or more pillars 35 placed along the top half of the front housing 19. The pillars 35 may be internally threaded to retain screws 37 inserted from the rear of the housing 11. The front housing 19 and back housing 21 combined form a total thickness 39 of the windsock 10 of about 0.5 inches to about 1.0 inches. In one embodiment, thickness 39 may be about 0.35 inches. Dimensions are illustrative and may be increased or decreased without departing from the scope of the invention.

The front housing 19 may also define a circular hole 43 near the center of the front housing 19. Hole 43 allows the depressible button 45 to be placed through the front housing 19, and to protrude forward from the front housing face 23.

The back housing 21 contacts the front housing 19 along the top half of the two housings 19, 21. The back housing 21 may define hole 49, or a plurality of holes 49 on the top half of the back housing for screws 37 to pass through to engage within the pillars 35. The holes 49 may be designed so that the screws 37 mechanically connect the back 21 and front housings 19, while providing a substantially flat surface on the face 51 of the back housing 21. The flat surface may comprise countersunk holes 49 for accommodating screws 37 so that the screw heads do not extend out over the flat surface.

A hand-held windsock according to the invention may be used to predict wind-generated displacement of an object in flight, such as a golf ball. For example, in response to a wind speed and direction reading obtained using a windsock 10, a golfer may need to adjust the selected numerical value of a golf club for a particular shot. Referring to FIG. 3, to assist the golfer in making this adjustment, a data table 28 may be displayed on one side of the housing 11. In one embodiment, the data table 28 may be displayed on the back housing 21. For example, the data table 28 may be printed on an adhesive label affixed to the back housing. In an alternative embodiment, the data table 28 may be printed directly on the face 51 of the back housing 21. The data table 28 may cross-reference information derived from the readings of the graduated dial indicator 13.

In one embodiment, the cross-referenced information may comprise numerical values that correspond to a quantitative adjustment, i.e., to assist a golfer in selecting a golf club. In other words, in response to a wind speed and direction, a golfer may need to adjust the selected numerical value of a golf club for a particular shot. For example, if the measured wind speed and direction corresponds to a +1 adjustment, the golfer may switch from a three iron club to a four iron club.

Alternative exemplary quantitative adjustments include predictions of wind-generated displacement of an object in flight, for example, a linear distance a golf ball may be deflected by the force of the wind. Another quantitative value displayed on the data table may relate to an adjustment to a golf swing, or a change in the distance to the target. In the example data listed in FIG. 3, the left-most column indicates a wind speed measured by reading the deflection of cord 15 relative to the graduated scale 32 of dial indicator 13. The next three columns indicate how the flight of a golf ball may be expected to vary as a result of the measured wind speed. If the wind direction reading indicates a tail wind, a user may refer to the TAILWIND column. The negative numerical values listed in the TAILWIND column tell the golfer to mentally subtract a particular negative value from the actual distance between the golf ball and the pin. For example, if the golfer finds herself on the fairway 100 yards from the pin and obtains a reading that indicates a 15 mph tailwind, she would subtract 10 yards, and select a club appropriate for a 90-yard shot. If instead, she measures a 15 mph headwind, she would add 9 yards and select a club appropriate for a 109-yard shot. If instead, she measures a 15 mph side wind (left or right), she may select a club appropriate for a 100-yard shot and adjust her swing to account for a 2-yard deflection of the ball in the direction of the wind. The values listed in the table of FIG. 3 are illustrative only, and do not limit the invention. Through experiment, the applicant has determined that there is a non-linear relationship between the wind speed and its affect on the distance for the flight of a golf ball. In addition, the applicant has determined that the distance in the flight of a golf ball affected by a head wind of a given speed is not the same magnitude of distance affected by a tail wind of the same wind speed. According to one embodiment of the invention, these non-linear relationships may be reflected in the data label 28.

Additionally, the quantitative adjustment listed on data table 28 may be unrelated to golf. Use of the windsock 10 is not limited to golf, and its use may extend to any activity where wind speed or direction is a factor. Exemplary alternative quantitative adjustments include adjustments for target shooting or hunting, adjustments for archery, or adjustments for flying model aircraft.

In an alternative embodiment, a belt clip (not shown) may be attached to the respective faces 23, 51 of the back housing 21, or front housing 19. In another embodiment, a divot fixer (not shown) may be attached to faces 23, 51 of the back housing 21, or to the front housing 19.

Referring again to FIG. 4, the bottom half of the back housing may contain one, or a multitude of holes 57 for receiving screws 63 to pass through to pillars 61 of an internal housing 59. The screws 63 on the bottom half of the housing 11 preferably do not penetrate into the gap 33 between the front housing 19 and the graduated dial indicator 13. The internal housing 59 is located between the front housing 19 and back housing 21. The internal housing 59 may be attached to the back housing 21 through pillars 61 located along the bottom half of the internal housing 59 designed to retain screws 63 inserted from the rear of the windsock 10. The internal housing 59 may also be mechanically held in place on the top half of the internal housing by screws or by mechanically wedging the internal housing 59 in place between the front housing 19 and back housing 21.

The graduated dial indicator 13 may be located along the bottom half of the front face of the internal housing 59, facing towards the front housing 19. The dial indicator 13 may comprise a label affixed to the front face of the internal housing 59, or the dial indicator 13 may be printed directly on the face of the internal housing 59. The dial indicator 13 may extend in a semi-circle around the edge of the front face of the internal housing 59, or may extend in any other manner to provide readings from the position of the cord 15. Readings from the dial indicator 13 may correspond with the data table 28 located on the respective faces 23, 51 of the back housing 21 or front housing 19.

The cord 15 length may be increased, extending outward from the housing 11. The cord 15 length may be extended outward from the housing 11 to a maximum length. The cord 15 may be retracted toward the housing 11, decreasing the length of the cord 15. In one embodiment, the cord 15 may be extended to a maximum length of about ten or twelve inches. The cord 15 may be of any length suitable to provide accurate wind measurements.

One embodiment of the windsock 10 utilizes a chute retraction system 80. The chute retraction system may be situated between the front housing 19 and back housing 21, and mechanically held in place by the internal housing 59. The chute retraction system mechanically retracts the cord 15 to the housing, decreasing the length of the cord 15. The chute retraction system 80 may comprise the depressible button 45, a compression spring 75, a clockwork spring 77 located between the internal housing 59 and back housing 21, and a spool 83. Spool 83 is mechanically linked to the clockwork spring 77. Button 45 provides a central axis for the spool 83. When button 45 is in a passive state, i.e. not depressed, compression spring 75 forces button 45 in a direction towards the front housing 19. The depressible button 45 extends rearward to the internal face of the back housing 21, and is held in place by the compression spring 75 which is compressed between the rear face of the back housing 21 and the interior of the depressible button 45. The depressible button 45 may conform to a clutch plate 79 which lies in contact with the spool 83, which prevents the spool 83 from rotating. When button 45 is in the passive state, the compression spring 75 holds the clutch plate 79 in contact with the spool 83. As the button 45 is pressed by the user, the pressure of the clutch 79 against the spool 83 is released, and the spool 83 is able to spin. The clockwork spring 77 provides torque against the spool 83, forcing it to rotate in a defined direction when it is able to spin with the clutch 79 disengaged. The spool 83 retains the cord 15 in the retracted mode, and may serve as the attachment point between the cord 15 and the housing 11. When the user initially rotates the spool 83 by extending the cord 15 away from the housing 11, the clockwork spring 77 is tensioned. When the clutch mechanism 79 is released, the clockwork spring 77 forces the spool 83 to retract the cord 15. In an alternative embodiment, the chute retraction system 80 may comprise a method of retracting the cord 15 by initially extending the cord 15, then subsequently quickly tugging on the cord 15 and releasing the cord 15 to allow it to retract.

The cord 15 may be composed of nylon, braided nylon, silk, or rayon, or any other material suitable for the use previously described. The cord 15 may be designed to bend easily at a housing attachment point, providing a sharp angle at a vertex point. The cord may be in a diameter 85 range of about 1.0 to 2.0 mm. The cord may be brightly colored, to allow for contrast and easy measurement against the graduated dial indicator 13. The cord 15 may be tethered to the housing 11 by a knot, or any other suitable method of attaching the cord 15 to the housing 11. The cord 15 may also be tethered to the spool by a knot or loop, or any other suitable method of attaching the cord to the housing 11. The opposite or lower end of cord 15 is securely attached to the miniaturized chute 17. For example, an attachment may be made by means of a knot or loop through a molded portion of the miniaturized chute 17, or with any other reliable method to attach the lower end of the cord 15 to the miniaturized chute 17.

The miniaturized chute 17 is designed to be propelled by a drag force produced by the wind. The miniaturized chute 17 may be composed of plastic, or any other lightweight rigid material configured to catch the wind. The shape of the miniaturized chute 17 provides a sufficient drag force to angularly displace the cord from its attachment point on the housing 11, yet allows the wind to flow around the miniaturized chute 17 to provide a steady measurement. Exemplary shapes for the miniaturized chute 17 include a substantially conical shape, a substantially semi-dome shape, a substantially pyramid shape, and a substantially rectangular shape. Another exemplary shape includes a bell-shaped design 89, as shown in FIG. 4. The bell shape 89 includes a conically shaped column tapering to a wider concave scoop attached to the base. The shape of the miniaturized chute 17 may be designed to allow the user to easily grasp and manipulate the miniaturized chute 17 to extend it from the housing 11.

Figure 5:
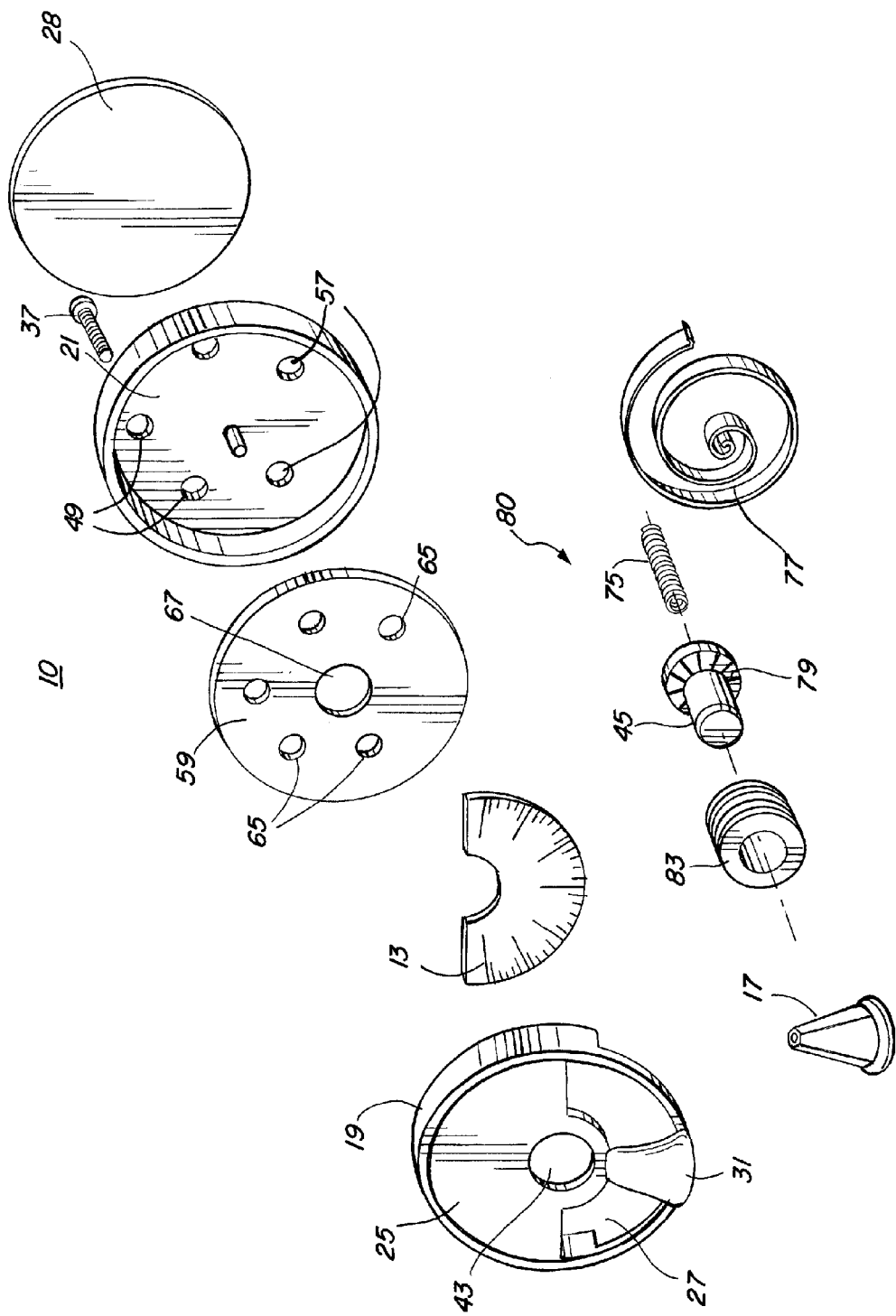
FIG. 5 is an exploded view of an embodiment of the handheld windsock with dial indicator.

FIG. 5 is an exploded view of an embodiment of the handheld windsock with dial indicator 10. The exploded view shows the construction of the front housing 19, the internal housing 59, and the back housing 21. Additionally, the exploded view illustrates the construction of the components in the chute retraction system 80.

Figure 6:
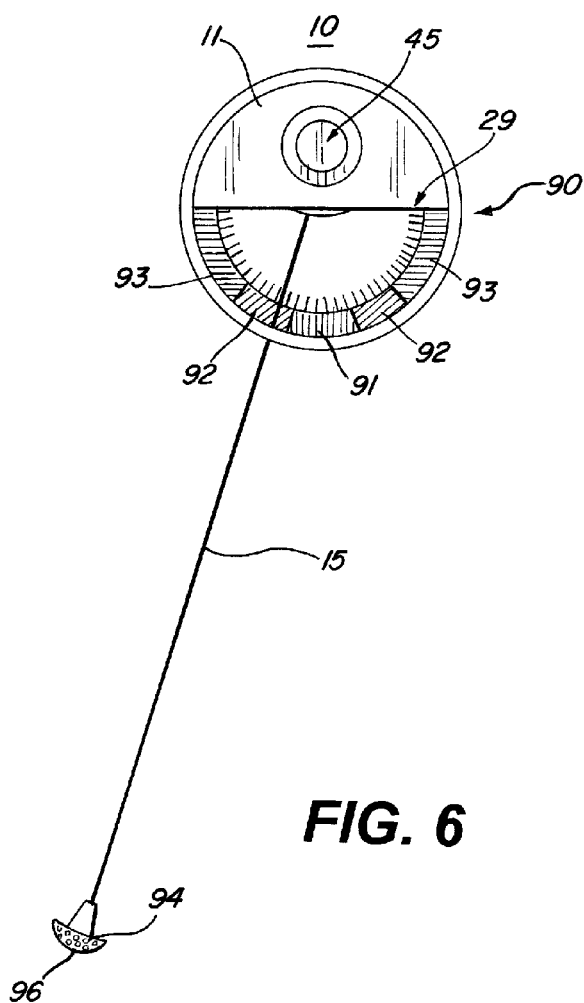
FIG. 6 is a front view of an alternative embodiment of the handheld windsock with dial indicator.

FIG. 6 is a front view of an alternative embodiment of the handheld windsock with dial indicator. In this embodiment, the graduated scale 32 may include a color-coded scale 73. Color-coded scale 73 may comprise a plurality of different color spans 91, 92, 93, each of which gives the user a more qualitative or approximate indication of wind speed. For example, a first color 91 may span graduation marks on either side of the zero line up to plus and minus 5 mph. A second color 92 may span graduation marks from 5 mph to 10 mph on either side of the scale. A third color 93 may span graduation marks from 10 mph to 15 mph on either side of the scale. In another embodiment, a particular color may span more or fewer graduation marks on the right side of zero than it spans on the left side of zero. Data table 28 may be similarly color-coded to provide for easy visual cross-referencing of wind speed readings to a quantitative adjustment.

FIG. 6 also shows an alternative exemplary shape of the miniaturized chute 17. The alternative exemplary shape includes a first portion that is substantially conical, an a second portion that is substantially an inverted concave dome, as shown. The narrow end of the cone attaches to the lower end of the cord 15. The wider end of the cone attaches to the inverted concave dome portion. In one embodiment, the inverted concave dome may have multiple perforations 96. The perforations 96 allow air to flow through the miniaturized chute to stabilize its flight and to reduce its weight. The size and number of perforations 96 may be adjusted to achieve a desired response of the miniaturized chute to an impacting wind.

The windsock 10 operates simply, consistently, and durably. In operation, a user first holds the windsock 10 outward by hand. The user then extends the miniaturized chute 17 toward the bottom of the housing 11, tethered by the cord 15, and allows the miniaturized chute 17 to hang. The user observes the direction the miniaturized chute 17 is forced by the wind. The user then orients the gap 33 parallel to the direction of the wind to achieve maximum displacement of the chute. The user also orients the rotation angle of the windsock 10 in line with the horizon. The user may utilize the straight line 29 extending across the housing 11 for visually orienting the housing 11 with the horizon. The user may alternatively utilize the bubble level for orienting the housing 11 with the horizon. The miniaturized chute 17 is then able to freely move in a direction parallel with the gap 33 so that the cord 15 may be displaced to a non-zero position on the graduated dial indicator 13. The user may then read the corresponding measurement on the graduated dial indicator 13, cross-reference that reading to information on the data table 28 on the back housing 21, and make a corresponding quantitative adjustment, for example, by numerically adjusting the selection of a golf club. Alternatively, a golfer may utilize the information from the data table to adjust the angle of a swing or the strength of the shot to achieve greater or lesser distance. The miniaturized chute 17 may be retracted with the chute retraction system 80. When retracted, the miniaturized chute 17 may be secured to the housing 11 at the attachment point 31.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A handheld windsock for measuring wind speed and direction, comprising:

a housing;

a graduated dial indicator mounted to the housing;
a cord attached to the housing; and
a miniaturized chute attached to an end of the cord;
wherein, in response to airflow, the miniaturized chute displaces the cord to a position on the dial indicator corresponding to wind speed.

2. The windsock of claim 1 further comprising a data table displayed on one side of the housing.

3. The windsock of claim 2 wherein the data table cross-references a measured wind speed to a quantitative adjustment.

4. The windsock of claim 3 wherein the quantitative adjustment indicates a numerical adjustment for selecting a golf club.

5. The windsock of claim 1 wherein the cord is extendable outward from the housing from a minimum length to a maximum length.

6. The windsock of claim 5 wherein the cord is retractable from the maximum length to the minimum length.

7. The windsock of claim 6 wherein the cord is retractable by a rotatable spool contained within the housing.

8. The windsock of claim 7 further comprising an attachment point formed on the housing for securing the miniaturized chute when the cord is fully retracted.

9. The windsock of claim 8 further comprising a spring-operated mechanism within the housing for retracting the cord to the rotatable spool.

10. The windsock of claim 9 further comprising a depressible button located on the housing for activating the spring-operated mechanism.

11. The windsock of claim 10 further comprising a clutch plate conforming to the depressible button.

12. The windsock of claim 1 wherein the housing is circularly shaped.

13. The windsock of claim 1 further comprising a transparent cover on the housing through which the dial indicator is visible.

14. The windsock of claim 1 further comprising a bubble level mounted to the housing.

15. The windsock of claim 1 further comprising a visible straight line extending across the housing for visually orienting the housing with the horizon.

16. The windsock of claim 1 further comprising a belt clip attached to one side of the housing.

17. The windsock of claim 1 further comprising a divot fixer attached to the housing.

18. The windsock of claim 1 wherein the graduated dial indicator is graduated by a color-coded pattern.

19. The windsock of claim 1 wherein the miniaturized chute comprises a conical portion and an inverted concave dome portion, the inverted concave dome portion having multiple perforations for stabilizing response of the miniaturized chute to an impacting wind.

20. A handheld windsock for predicting wind-generated displacement of an object in flight, comprising:
a housing having a transparent surface and a back surface;
a dial indicator mounted within the housing and having graduated markings corresponding to wind speed and visible through the transparent surface;
a data table displayed on the back surface cross-referencing a measured wind speed to a quantitative prediction;
a chute retraction system mounted within the housing;
a cord attached to and extendible below the housing, the cord overlaying the dial indicator and movable between the dial indicator and the transparent surface, the cord having an upper end and a lower end, the upper end attached to the chute retraction system; and
a miniaturized chute attached to the lower end of the cord, the chute having a conical portion and an inverted concave dome portion, the inverted concave dome portion having multiple perforations for stabilizing response of the miniaturized chute to airflow;
wherein, with the cord extended below the housing, the miniaturized chute in response to airflow displaces the cord to a position overlaying a graduated marking that corresponds to actual wind speed.

\* \* \* \* \*